(12) United States Patent
Chen et al.

(10) Patent No.: US 11,659,112 B1
(45) Date of Patent: May 23, 2023

(54) SCANNER AND LOAD BEARING STRUCTURE THEREOF

(71) Applicant: Teco Image Systems Co., Ltd., New Taipei (TW)

(72) Inventors: Wei-Shen Chen, New Taipei (TW); Yi-Hsuan Tsai, New Taipei (TW)

(73) Assignee: TECO IMAGE SYSTEMS CO., LTD., New Taipei (TW)

( * ) Notice: Subject to any disclaimer, the term of this patent is extended or adjusted under 35 U.S.C. 154(b) by 0 days.

(21) Appl. No.: 17/561,515

(22) Filed: Dec. 23, 2021

(30) Foreign Application Priority Data

Dec. 6, 2021 (TW) .................................. 110145472

(51) Int. Cl.
*H04N 1/00* (2006.01)
(52) U.S. Cl.
CPC .............................. *H04N 1/00538* (2013.01)
(58) Field of Classification Search
None
See application file for complete search history.

(56) References Cited

U.S. PATENT DOCUMENTS

| 6,205,230 | B1 | 3/2001 | Sundman et al. | |
| 7,359,096 | B2* | 4/2008 | Huang | H04N 1/1017 358/496 |
| 2005/0088706 | A1* | 4/2005 | Lin | H04N 1/1013 358/497 |
| 2005/0094220 | A1* | 5/2005 | Lin | H04N 1/1017 358/494 |
| 2007/0058216 | A1* | 3/2007 | Chen | H04N 1/1017 358/474 |
| 2011/0181924 | A1* | 7/2011 | Mui | H04N 1/103 358/497 |

FOREIGN PATENT DOCUMENTS

| CN | 101212542 B | 12/2010 |
| CN | 107136649 A | 9/2017 |
| CN | 108513032 A | 9/2018 |
| JP | 2000216952 A | 8/2000 |
| JP | 2019010394 A | 1/2019 |
| KR | 20040001693 A | 1/2004 |
| KR | 20200006324 A | 1/2020 |

* cited by examiner

*Primary Examiner* — Miya J Williams
(74) *Attorney, Agent, or Firm* — Kirton McConkie; Evan R. Witt (57) ABSTRACT

A scanner is provided and includes a load bearing element, a scan assembly, a transparent plate and a casing. The load bearing element includes a support element and a base. The support element is disposed on the base and surrounds the base. The scan assembly is configured to perform a scan operation and is disposed on the base. The transparent plate is disposed on the support element and is configured to bear an object. The casing includes a first casing part and a second casing part. The second casing part includes a bottom plate and at least one cylinder. The at least one cylinder is disposed on the bottom plate. The load bearing element is disposed on the at least one cylinder, and is located between the first casing part and the second casing part. A first buffer space is formed between the base and the bottom plate.

20 Claims, 8 Drawing Sheets

SCANNER AND LOAD BEARING STRUCTURE THEREOF

CROSS-REFERENCE TO RELATED APPLICATION

This application claims priority to Taiwan Patent Application No. 110145472, filed on Dec. 06, 2021. The entire contents of the above-mentioned patent applications are incorporated herein by reference for all purposes.

FIELD OF THE INVENTION

The present disclosure relates to a scanner, and more particularly to a scanner having a load bearing structure.

BACKGROUND OF THE INVENTION

Nowadays, the transmission element of the traditional scanner is usually disposed on the casing. However, when an object to be scanned is heavy, such as an object having a weight greater than 30 kg or feet of a human body, the scanner is usually unable to bear such an object, and abnormal scan results or damage to the components of the scanner may be caused.

Figure 1:
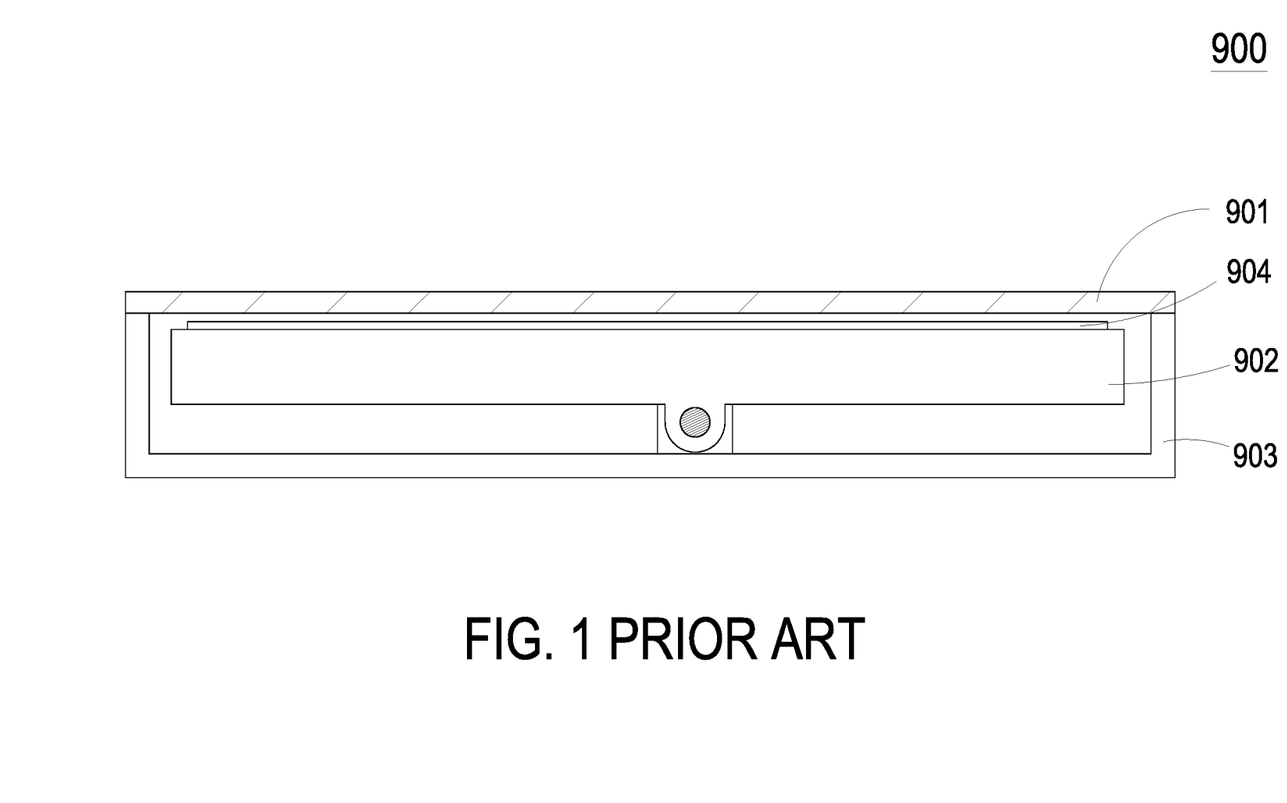
FIG. 1 is a schematic cross-sectional view showing a scanner of a prior art.

Please refer to FIG. 1. FIG. 1 is a schematic cross-sectional view showing a scanner of a prior art. The scanner 900 of the prior art includes a glass plate 901, a transmission element 902, a casing 903 and an optical element 904. The transmission element 902 is disposed in the interior space of the casing 903. A rod of the transmission element 902 is directly connected to two opposed sidewalls of the casing 903. The glass plate 901 is disposed on the top of the casing 903. The optical element 904 is disposed on the transmission element 902, and faces toward the glass plate 901. When an object to be scanned is disposed on the glass plate 901, the optical element 904 is driven to move by the transmission element 902, and scans the object through the glass plate 901. However, when the object to be scanned is heavy, the glass plate 901 and the casing 903 are deformed due to the gravity, which results in an abnormal of the scanning focal length of the optical element 904. Moreover, the transmission element 902 is clamped between the glass plate 901 and the casing 903. Consequently, the movement of the transmission element 902 is delayed or the transmission element 902 is jammed. In addition, the glass plate 901 of the scanner 900 is fixed on the casing 903 by glue. If a heavy object is disposed on the glass plate 901, the glass plate 901 and casing 903 are separated easily, which results in damage to the scanner 900.

Therefore, there is a need of providing a scanner and a load bearing structure thereof to obviate the drawbacks encountered from the prior arts.

SUMMARY OF THE INVENTION

It is an object of the present disclosure to provide a scanner and a load bearing structure thereof, so as to prevent the movement of the scan assembly from being delayed or prevent the scan assembly from being jammed caused by clamping the scan assembly between the base of the load bearing element and the transparent plate, enhance the load-bearing strength, and perform the scan operation of the object under high load conditions.

In accordance with an aspect of the present disclosure, there is provided a scanner. The scanner includes a load bearing element, a scan assembly, a transparent plate and a casing. The load bearing element includes a support element and a base. The support element is disposed on the base and surrounds the base. The scan assembly is configured to perform a scan operation and is disposed on the base. The transparent plate is disposed on the support element and configured to bear an object. The casing includes a first casing part and a second casing part. The second casing part includes a bottom plate and at least one cylinder. The at least one cylinder is disposed on the bottom plate. The load bearing element is fixed on the at least one cylinder of the second casing part, and located between the first casing part and the second casing part. A first buffer space is formed between the base of the load bearing element and the bottom plate of the second casing part.

In accordance with an aspect of the present disclosure, there is provided a load bearing structure. The load bearing structure includes a casing, a plate and a load bearing element. The casing includes a bottom plate and at least one cylinder. The at least one cylinder is disposed on the bottom plate. The plate is configured to bear an object. The load bearing element is fixed on the at least one cylinder, and includes a support element and a base. The support element is disposed on the base and surrounds the base. The plate is disposed on the support element. A first buffer space is formed between the base and the bottom plate of the casing.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 2:
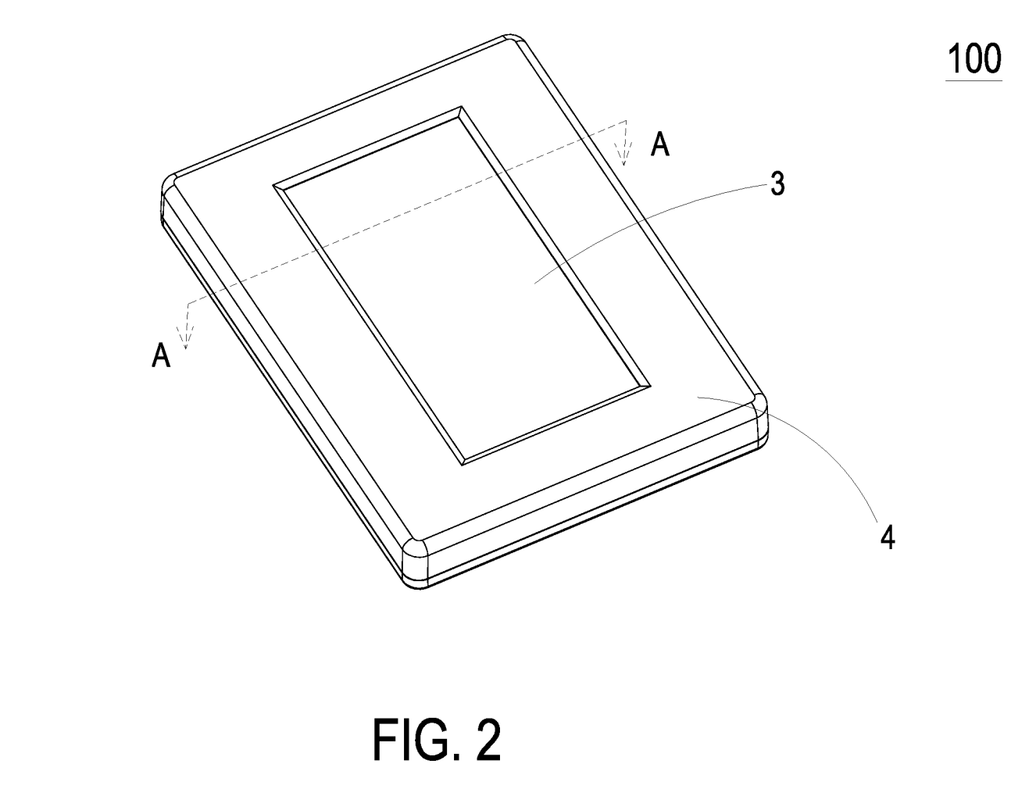
FIG. 2 is a schematic view showing a scanner according to an embodiment of the present disclosure.
Figure 3A:
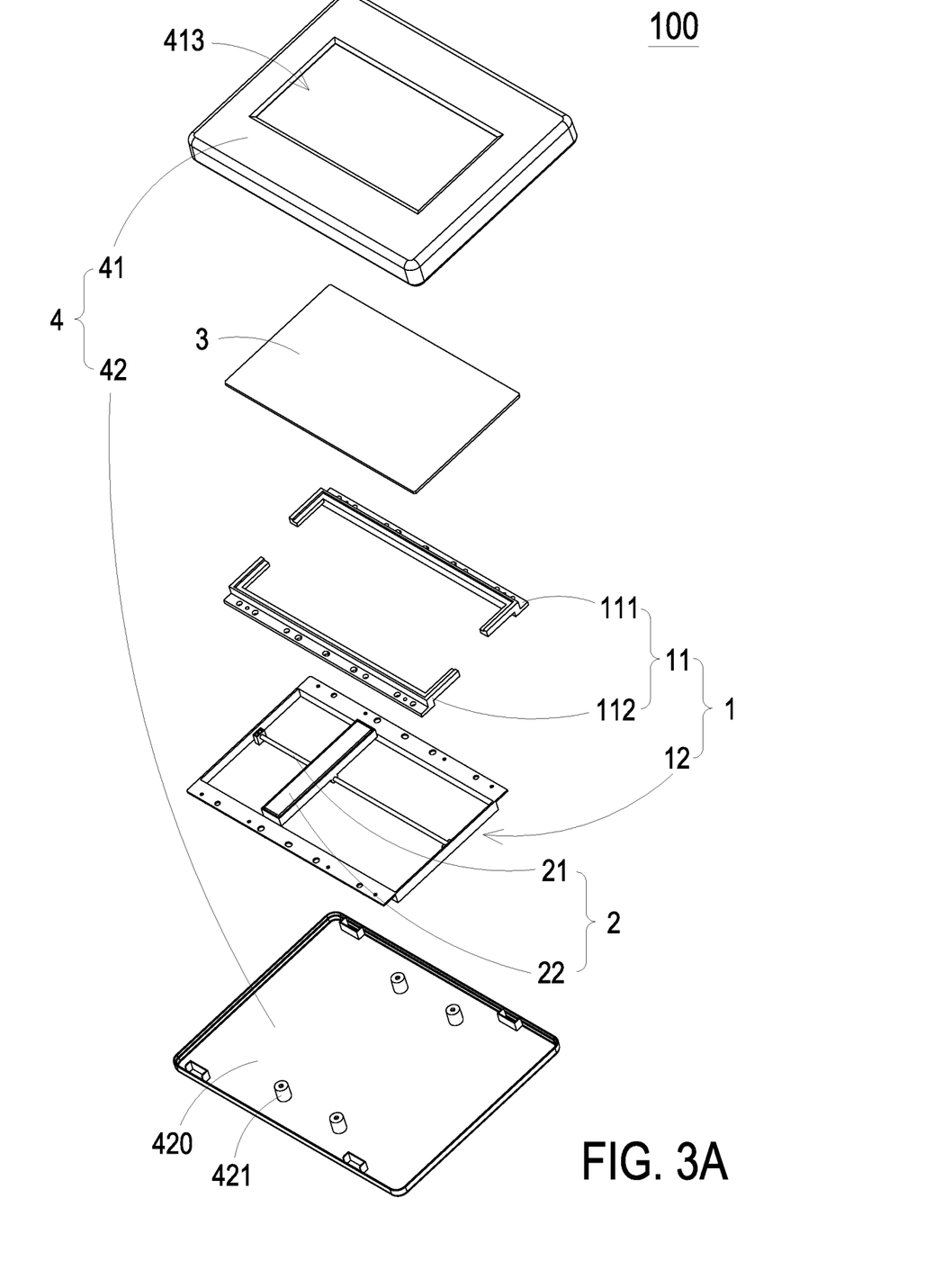
FIG. 3A and FIG. 3B are schematic exploded views showing the scanner of FIG. 2.
Figure 3B:
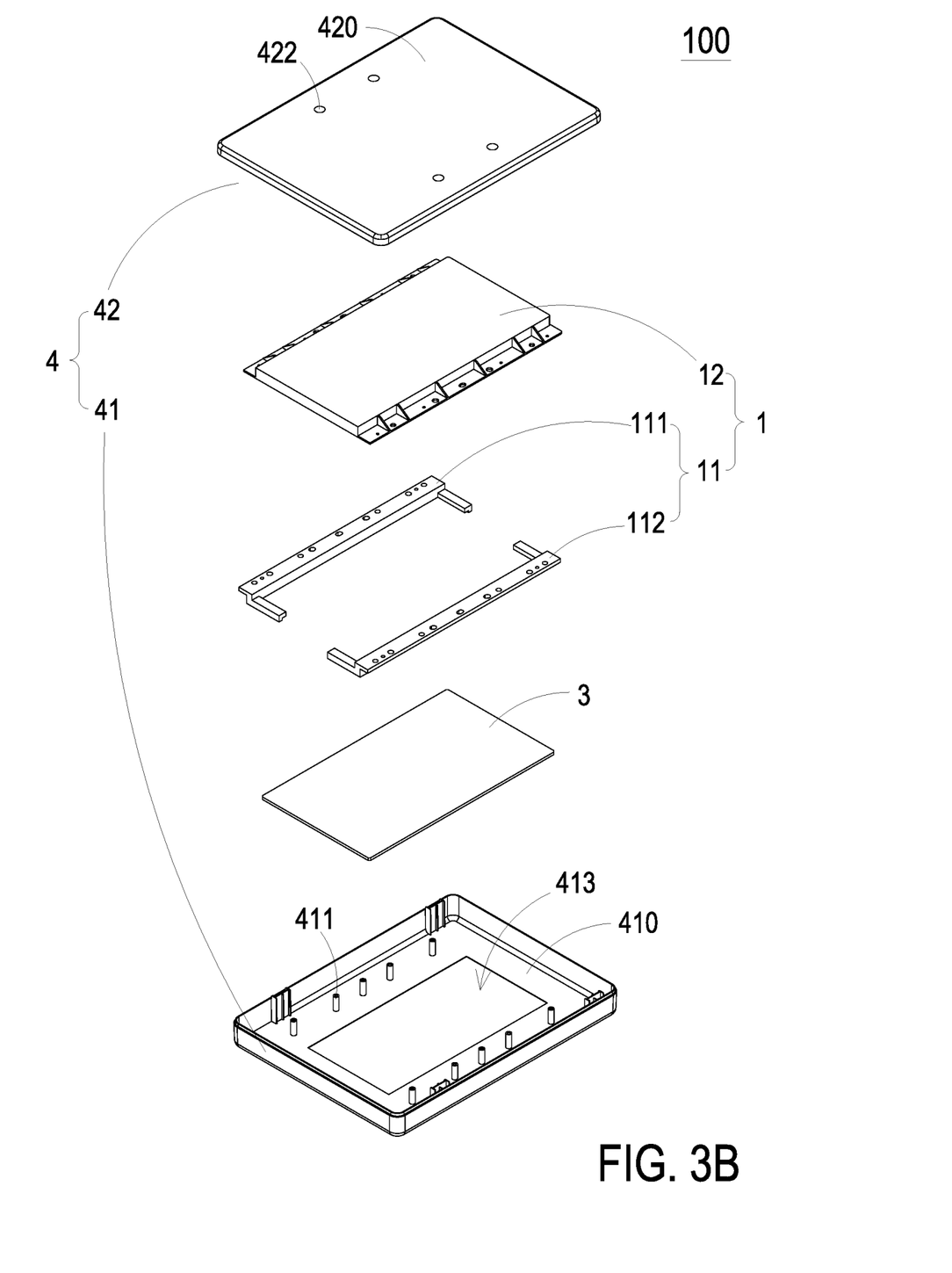
Figure 4:
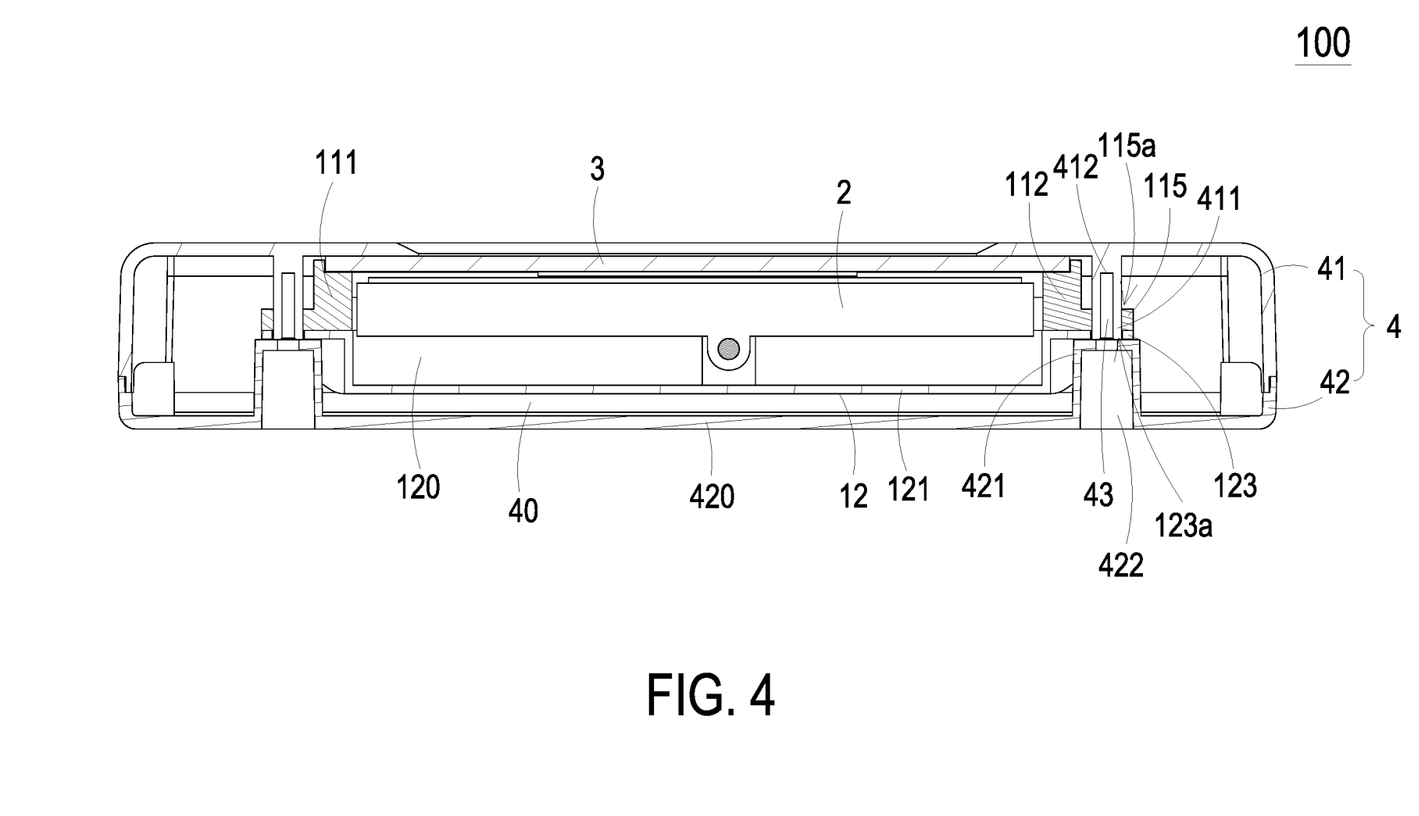
FIG. 4 is a cross-sectional view showing the scanner of FIG. 2 and taken along the line A-A.

Please refer to FIG. 2, FIG. 3A, FIG. 3B and FIG. 4. FIG. 2 is a schematic view showing a scanner according to an embodiment of the present disclosure, FIG. 3A and FIG. 3B are schematic exploded views showing the scanner of FIG. 2, and FIG. 4 is a cross-sectional view showing the scanner of FIG. 2 and taken along the line A-A. The scanner 100 of the present disclosure includes a load bearing structure to perform a scan operation of an object under high load conditions. The scanner 100 includes a load bearing element 1, a scan assembly 2, a transparent plate 3 and a casing 4. The load bearing element 1 includes a support element 11 and base 12. The support element 11 is a frame bracket, and is disposed on the base 12 and surrounds the base 12. The scan assembly 2 is configured to perform a scan operation and is disposed on the base 12. The transparent plate 3 is disposed on the support element 11 of the load bearing element 1. The transparent plate 3 is a plate structure, for example but not limited to a glass plate, and is configured to bear an object to be scanned. The casing 4 includes a first casing part 41 and a second casing part 42. The second casing part 42 includes a bottom plate 420 and at least one cylinder 421. The at least one cylinder 421 is disposed on the bottom plate 420. The load bearing element 1 is fixed on the at least one cylinder 421 of the second casing part 42, and is located between the first casing part 41 and the second casing part 42. A first buffer space 40 is formed between the base 12 of the load bearing element 1 and the bottom plate 420 of the second casing part 42. In other words, the load bearing element 1 is suspended in the casing 4. In the present embodiment, the second casing part 42 includes a plurality of cylinders 421, but not limited thereto. In the present embodiment, the load bearing element 1, the transparent plate 3 and casing 4 are defined as a load bearing structure of the scanner 100. When an object is disposed on the transparent plate 3 of scanner 100, and the scan assembly 2 performs the scan operation to the object, so that the object is scanned. Due to the load bearing structure described above, if the object to be scanned is under high load conditions, such as the object having a weight greater than 30 KG or feet of human body, the first buffer space 40 provides enough deformation space for the load bearing element 1 and the transparent plate 3, so as to prevent the movement of the scan assembly 2 from being delayed or prevent the scan assembly 2 from being jammed caused by clamping the scan assembly 2 between the base 12 of the load bearing element 1 and the transparent plate 3. Consequently, the scanning of heavy object is performed.

Figure 5A:
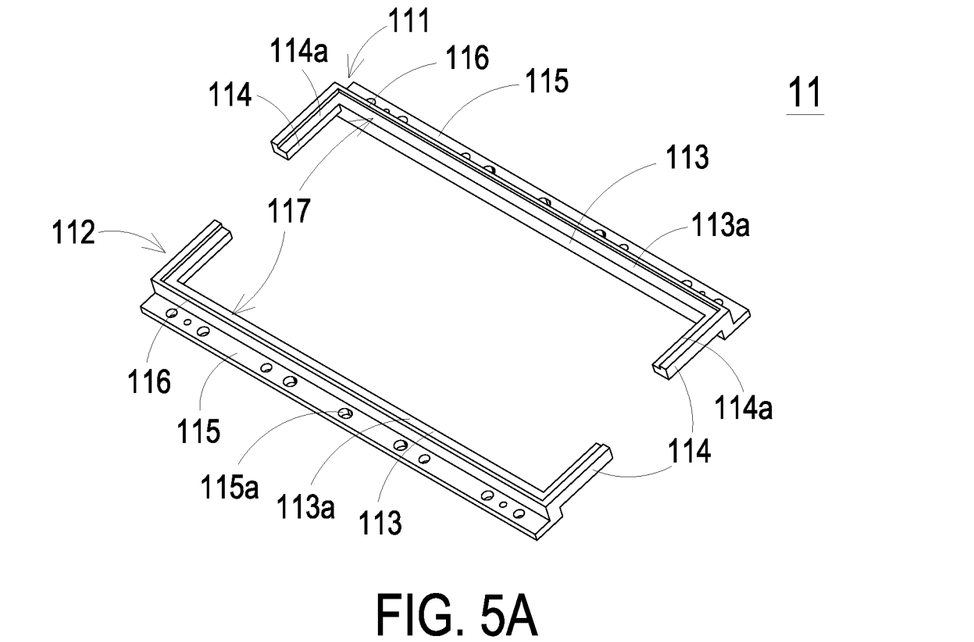
FIG. 5A and FIG. 5B are schematic views showing a support element of a load bearing element of the scanner of FIG. 3A and FIG. 3B.
Figure 5B:
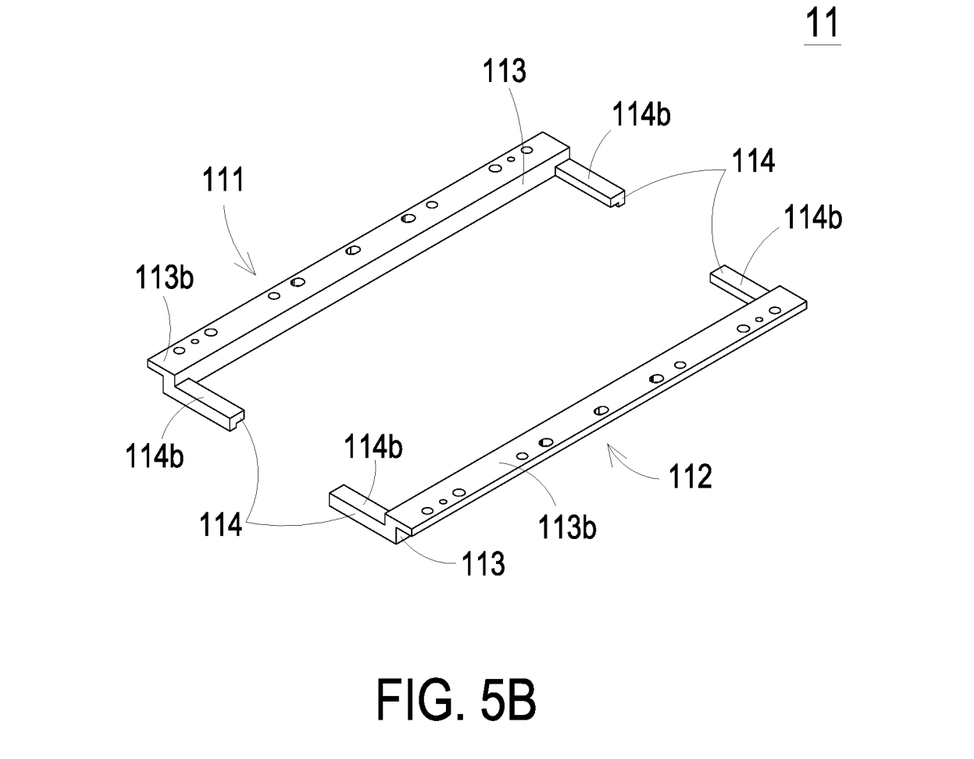
Figure 6:
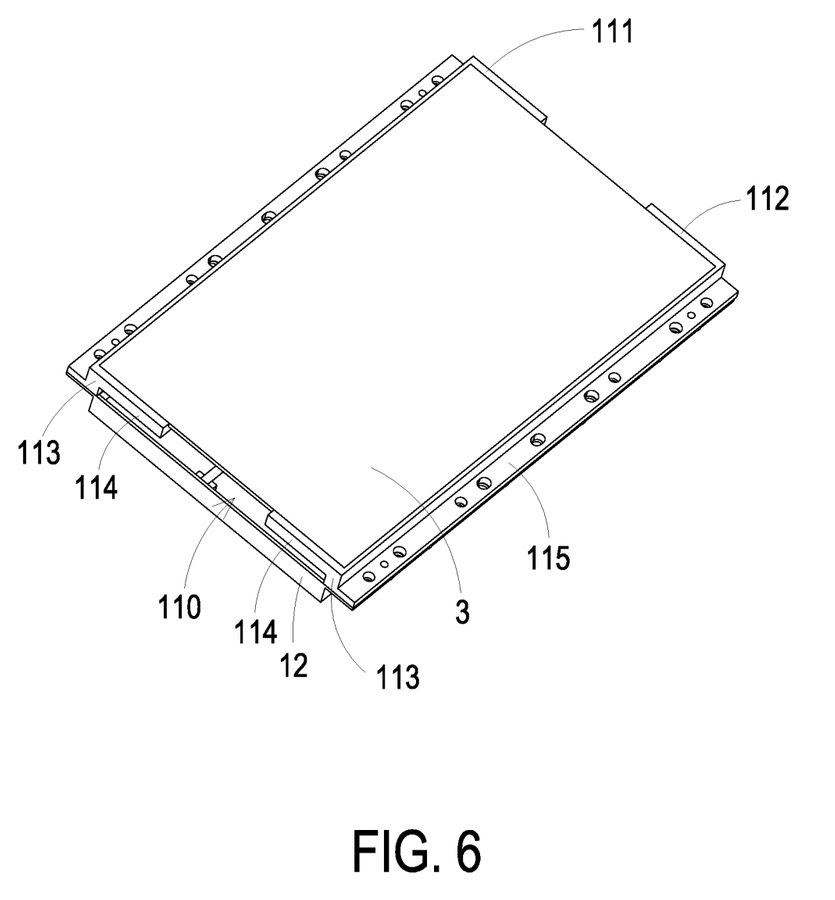
FIG. 6 is a schematic view showing the load bearing element, a scan assembly and a transparent plate of FIG. 2 assembled as a modular structure.

Please refer to FIG. 4, FIG. 5A, FIG. 5B and FIG. 6. FIG. 5A and FIG. 5B are schematic views showing a support element of a load bearing element of the scanner of FIG. 3A and FIG. 3B, and FIG. 6 is a schematic view showing the load bearing element, a scan assembly and a transparent plate of FIG. 2 assembled as a modular structure. The support element 11 includes a first frame part 111 and a second frame part 112. The first frame part 111 and the second frame part 112 are components with the same structure and appearance, are symmetrically disposed on the base 12, and surround the base 12, but not limited thereto. The first frame part 111 and the second frame part 112 are disposed on the base 12 and spaced apart from each other. At least one second buffer space 110 is formed among the first frame part 111, the second frame part 112, the base 12 and the transparent plate 3. In the present embodiment, two second buffer spaces 110 are formed among the first frame part 111, the second frame part 112, the base 12 and the transparent plate 3, but not limited thereto. Under high load conditions, the second buffer spaces 110 provide enough deformation space for the transparent plate 3 and the support element 11 of the load bearing element 1, so as to prevent the movement of the scan assembly 2 from being delayed or prevent the scan assembly 2 from being jammed caused by clamping the scan assembly between the base 12 of the load bearing element 1 and the transparent plate 3.

In an embodiment, the first frame part 111 and the second frame part 112 of the support element 11 include a first portion 113 and at least one second portion 114, respectively. In the present embodiment, the first frame part 111 and the second frame part 112 include two second portions 114, respectively, but not limited thereto. The two second portions 114 are extended from two ends of the first portion 113, respectively. The first portions 113 of the first frame part 111 and the second frame part 112 of the support element 11 have a first top surface 113a and a first bottom surface 113b, respectively. The two second portions 114 have a second top surface 114a and a second bottom surface 114b, respectively. The first top surface 113a of the first portion 113 is coplanar with the two second top surfaces 114a of the two second portions 114. A step is formed between the first bottom surface 113b of the first portion 113 and the second bottom surface 114b of the second portion 114. The first bottom surface 113b of the first portion 113 is relatively lower than the second bottom surface 114b of the second portion 114. Two second buffer spaces 110 are formed among the first portion 113 and the two second portions 114 of the first frame part 111, the first portion 113 and the two second portions 114 of the second frame part 112, the base 12 and the transparent plate 3, but not limited thereto.

Figure 7A:
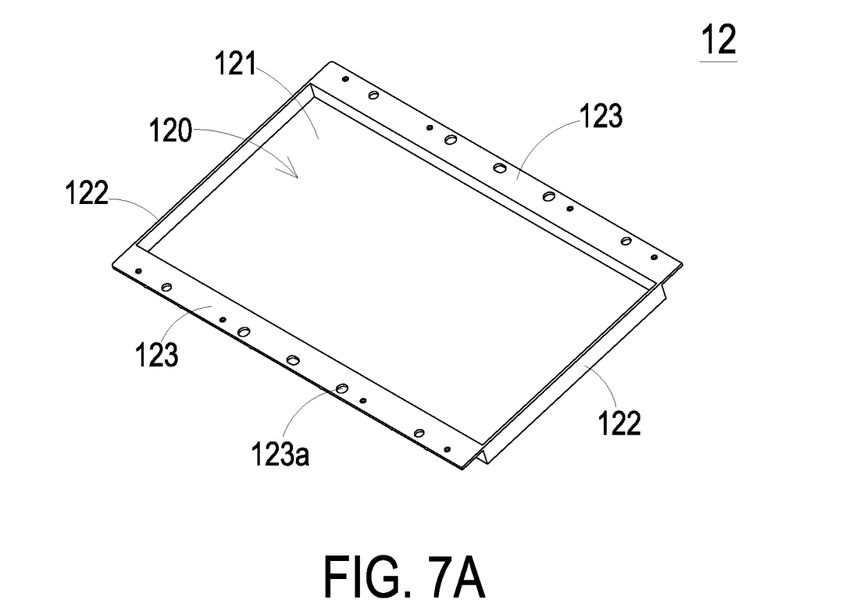
FIG. 7A and FIG. 7B are schematic views showing a base of the load bearing element of the scanner of FIG. 3A and FIG. 3B.
Figure 7B:
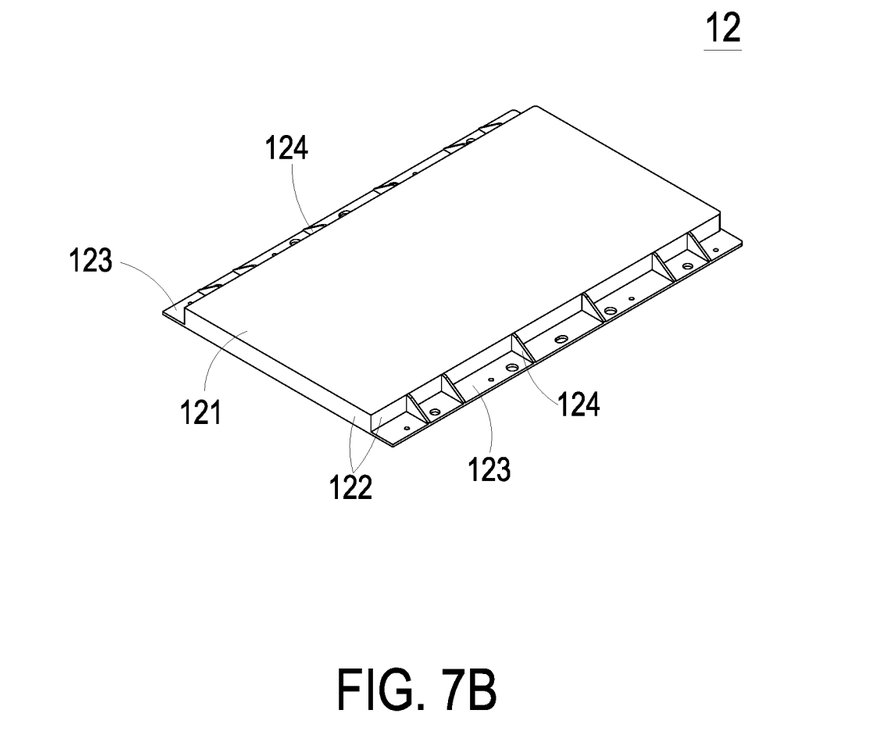

Please refer to FIG. 5A, FIG. 5B, FIG. 6, FIG. 7A and FIG.7B. FIG. 7A and FIG. 7B are schematic views showing a base of the load bearing element of the scanner of FIG. 3A and FIG. 3B. As shown in FIG. 5A and FIG. 5B, the support element 11 of the load bearing element 1 includes at least one first fixing plate 115. In the present embodiment, the support element 11 includes two first fixing plates 115, but not limited thereto. The two first fixing plates 115 are disposed on the first portion 113 of the first frame part 111 and the first portion 113 of the second frame part 112, respectively, and extend toward directions away from the second portion 114. In an embodiment, the two first fixing plates 115 are connected to the edge of the bottom of the corresponding one of the first portions 113, respectively. As shown in FIG. 7A and FIG. 7B, the base 12 of the load bearing element 1 includes a bottom plate 121, a plurality of side plates 122 and at least one second fixing plate 123. In the present embodiment, the base 12 includes two second fixing plates 123, but not limited thereto. The plurality of sidewalls 122 are connected adjacent to each other, and connected with the bottom plate 121 to form an accommodation space 120. The two second fixing plates 123 are disposed on the two opposed sidewalls 122, and extend toward directions away from the accommodation space 120. In an embodiment, the two second fixing plates 123 are connected to the edge of the top of the corresponding one of the sidewalls 122. As shown in FIG. 6, the two first fixing plates 115 of the support element 11 are correspondingly disposed on the two second fixing plates 123 of the base 12, respectively. The two second fixing plates 123 are correspondingly fixed on the cylinders 421 of the second casing part 42 of the casing 4, respectively. The load bearing element 1 is suspended in the casing 4, and the first buffer space 40 is formed between the base 12 of the load bearing element 1 and the bottom plate 420 of the second casing part 42. In an embodiment, the base 12 includes a plurality of reinforcing ribs 124. The plurality of reinforcing ribs 124 are disposed between the sidewalls 122 and the two second fixing plates 123 of the base 12, and configured to provide support for the second fixing plates 123, so as to prevent the second fixing plates 123 from being broken due to forces.

In the present embodiment, the scan assembly 2 is disposed in the accommodation space 120 of the base 12 of the load bearing element 1, and is spaced apart from the bottom plate 121 of the base 12 at a specific distance. In an embodiment, the scan assembly 2 includes an optical module 21 and a guiding rod 22. Two ends of the guiding rod 22 are fixed on the two opposed sidewalls 122 of the base 12. The optical module 21 is movably disposed on the guiding rod 22, so as to perform the scan operation. Under high load conditions, the distance between the bottom plate 121 of the base 12 and the scan assembly 2 provides enough deformation space for the transparent plate 3 and the scan assembly 2, so as to prevent the movement of the scan assembly 2 from being delayed or prevent the scan assembly 2 from being jammed caused by clamping the scan assembly 2 between the base 12 of the load bearing element 1 and the transparent plate 3.

Please refer to FIG. 3A, FIG. 3B and FIG. 4. The first casing part 41 of the casing 4 includes a top plate 410 and at least one positioning pillar 411. In the present embodiment, the first casing part 41 includes a plurality of positioning pillars 411, but not limited thereto. The plurality of positioning pillars 411 are disposed on the top plate 410, respectively. In the present embodiment, the first fixing plate 115 has a plurality of perforations 115*a*, and the second fixing plate 123 has a plurality of perforations 123*a*. The plurality of perforations 115*a* of the first fixing plate 115 are disposed corresponding to the plurality of perforations 123*a* of the second fixing plate 123, respectively. The plurality of positioning pillars 411 penetrate through the corresponding one of the perforations 115*a* and the corresponding one of the perforations 123*a*, respectively, so that the plurality of positioning pillars 411 of the first casing part 41 position the support element 11 and are assembled with the corresponding one of the plurality of cylinders 421 of the second casing part 42, respectively.

As shown in FIG. 4, in the present embodiment, each of the positioning pillars 411 has a first fixing hole 412. The first fixing hole 412 is recessed from a free end of the positioning pillar 411. Each of the cylinders 421 of the second casing part 42 has a second fixing hole 422. The second fixing hole 422 penetrates through a free end of the cylinder 421 and the bottom plate 420. The second fixing holes 422 of the plurality of cylinders 421 are disposed corresponding to the first fixing holes 412 of the plurality of positioning pillars 411, respectively. The casing 4 includes at least one fixing element 43. In the present embodiment, the casing 4 includes a plurality of fixing elements 43, but not limited thereto. The fixing element 43 is for example but not limited to a screw. The plurality of fixing elements 43 are fixed to the corresponding one of the first fixing holes 412 of the plurality of positioning pillars 411 through the corresponding one of the second fixing holes 422 of the plurality of cylinders 421, respectively. Consequently, the first casing part 41 is fixed on the second casing part 42.

In an embodiment, the number of the positioning pillars 411 is more than the number of the cylinders 421. The plurality of cylinders 421 are disposed on the corresponding number of the plurality of positioning pillars 411, respectively. The plurality of fixing elements 43 are fixed to the corresponding one of the second fixing holes 422 of the cylinders 421 and the corresponding one of the first fixing holes 412 of the positioning pillars 411, respectively. At least part of the positioning pillars 411 penetrates through the corresponding one of the plurality of perforations 115*a* and the corresponding one of the plurality of perforations 123*a* of the load bearing element 1, respectively. The plurality of fixing elements 43 are fixed to the corresponding one of the first fixing holes 412 of the plurality of positioning pillars 411. Consequently, the load bearing element 1 is fixed to the plurality of positioning pillars 411 of the first casing part 41.

Please refer to FIG. 5A, FIG. 5B and FIG. 6. In the present embodiment, the first frame part 111 and the second frame part 112 of the support element 11 includes a positioning wall 116, respectively. The positioning wall 116 is disposed on the first top surface 113*a* of the first portion 113 and the second top surfaces 114*a* of the second portions 114 of the first frame part 111 and is disposed on the first top surface 113*a* of the first portion 113 and the second top surfaces 114*a* of the second portions 114 of the second frame part 112. A positioning recess 117 is formed among the positioning wall 116, the first portion 113 and the two second portions 114. The positioning wall 116 surrounds the transparent plate 3. At least part of the transparent plate 3 is disposed in the positioning recess 117 of the first frame part 111 and the second frame part 112. Since the transparent plate 3 is fixed to and positioned on the support element 11 through the positioning wall 116 and the positioning recess 117, the transparent plate 3 is firmly fixed and disposed on the support element 11, and the separation of the transparent plate 3 and the support element 11 is prevented.

Please refer to FIG. 3A, FIG. 3B and FIG. 4. In the present embodiment, the top plate 410 of the first casing part 41 has an opening 413. The opening 413 runs through the top plate 410. At least part of the transparent plate 3 is disposed corresponding to the opening 413 of the first casing part 41. At least part of the transparent plate 3 is clamped between the top plate 410 and the positioning recess 117 of the support element 11. Consequently, the separation of the transparent plate 3 and the support element 11 is prevented.

In an embodiment, the first frame part 111, the second frame part 112 of the support element 11 and the base 12 are made of aluminum by an extruding process, respectively, but not limited thereto. In the present embodiment, the scanner 100 is preferably a foot scanner for medical and healthcare applications, but not limited thereto.

From the above descriptions, the present disclosure provides a scanner. The load bearing element, the transparent plate and the casing of the scanner are defined as a load bearing structure. When the object to be scanned is under high load conditions, the first buffer space between the base of the load bearing element and the bottom plate of the second casing part provides enough deformation space for the load bearing element and the transparent plate, the second buffer spaces between the support element of the load bearing element and base provides enough deformation space for the transparent plate and the support element of the load bearing element, and the distance between the bottom plate of the base and the scan assembly provides enough deformation space for the transparent plate and the scan assembly, so as to prevent the movement of the scan assembly from being delayed or prevent the scan assembly from being jammed caused by camping the scan assembly between the base of the load bearing element and the transparent plate. Therefore, the scan operation of an object under high load conditions is performed.

While the disclosure has been described in terms of what is presently considered to be the most practical and preferred embodiments, it is to be understood that the disclosure needs not be limited to the disclosed embodiment.

What is claimed is:
1. A scanner, comprising:
   a load bearing element comprising a support element and a base, wherein the support element is disposed on the base and surrounds the base;

a scan assembly configured to perform a scan operation and disposed on the base;

a transparent plate disposed on the support element and configured to bear an object; and a casing comprising a first casing part and a second casing part, wherein the second casing part comprises a bottom plate and at least one cylinder, the at least one cylinder is disposed on the bottom plate;

wherein the load bearing element is fixed on the at least one cylinder of the second casing part, and is located between the first casing part and the second casing part, wherein a first buffer space is formed between the base of the load bearing element and the bottom plate of the second casing part.

2. The scanner according to claim 1, wherein the support element comprises a first frame part and a second frame part, the first frame part and the second frame part are symmetrically disposed on the base and surround the base, and are spaced apart from each other, wherein at least one second buffer space is formed among the first frame part, the second frame part, the base and the transparent plate.

3. The scanner according to claim 2, wherein the first frame part, the second frame part and the base are made of aluminum by an extruding process, respectively.

4. The scanner according to claim 2, wherein the first frame part and the second frame part comprise a first portion and at least one second portion, respectively, the at least one second portion is extend from at least one end of the first portion, wherein the at least one second buffer space is formed among the first portion and the at least one second portion of the first frame part, the first portion and the at least one second portion of the second frame part, the base and the transparent plate.

5. The scanner according to claim 4, wherein the support element comprises at least one first fixing plate, the at least one first fixing plate is disposed on at least one of the first portion of the first frame part and the first portion of the second frame part, and extends toward a direction away from the at least one second portion, wherein the base comprises a bottom plate, a plurality of sidewalls and at least one second fixing plate, wherein the plurality of sidewalls are connected adjacent to each other, and connected with the bottom plate to form an accommodation space, wherein the at least one second fixing plate is disposed on at least one of the plurality of sidewalls, and extends toward a direction away from the accommodation space, wherein the at least one first fixing plate is correspondingly disposed on the at least one second fixing plate, and the at least one second fixing plate is correspondingly fixed on the at least one cylinder of the second casing part, wherein the scan assembly is disposed in the accommodation space of the base of the load bearing element, and is spaced apart from the bottom plate of the base at a specific distance.

6. The scanner according to claim 5, wherein the base comprises a plurality of reinforcing ribs, wherein the plurality of reinforcing ribs are disposed between the plurality of sidewalls and the at least one second fixing plate, respectively.

7. The scanner according to claim 5, wherein the first casing part comprises a top plate and at least one positioning pillar, and the at least one positioning pillar is disposed on the top plate, wherein the at least one first fixing plate has at least one perforation, the at least one second fixing plate has at least one perforation, and the at least one positioning pillar penetrates through the at least one perforation of the at least one first fixing plate and the at least one perforation of the at least one second fixing plate, and is assembled with the at least one cylinder of the second casing part.

8. The scanner according to claim 7, wherein the at least one positioning pillar has a first fixing hole, and the first fixing hole is recessed from a free end of the at least one positioning pillar, wherein the at least one cylinder of the second casing part has a second fixing hole, and the second fixing hole penetrates through a free end of the at least one cylinder and the bottom plate, wherein the second fixing hole is disposed corresponding to the first fixing hole, wherein the casing comprises at least one fixing element, and the at least one fixing element is fixed to the first fixing hole of the at least one positioning pillar through the second fixing hole of the at least one cylinder.

9. The scanner according to claim 7, wherein the top plate of the first casing part has an opening, and the opening penetrates through the top plate, wherein at least part of the transparent plate is disposed corresponding to the opening of the first casing part, and at least part of the transparent plate is clamped between the top plate and the support element.

10. The scanner according to claim 4, wherein the first portion comprises a first top surface and a first bottom surface, and the at least one second portion comprises a second top surface and a second bottom surface, wherein the first top surface of the first portion is coplanar with the second top surface of the at least one second portion, wherein a step is formed between the first bottom surface of the first portion and the second bottom surface of the at least one second portion.

11. The scanner according to claim 10, wherein the first frame part and the second frame part of the support element comprise a positioning wall, respectively, wherein the positioning wall is disposed on the first top surface of the first portion and the second top surface of the second portion of the first frame part and is disposed on the first top surface of the first portion and the second top surface of the second portion of the second frame part, and a positioning recess is formed among the positioning wall, the first portion and the at least one second portion, wherein the positioning wall surrounds the transparent plate, and at least part of the transparent plate is disposed in the positioning recess.

12. A load bearing structure, comprising:

a casing comprising a bottom plate and at least one cylinder, wherein the at least one cylinder is disposed on the bottom plate;

a plate configured to bear an object; and a load bearing element fixed on the at least one cylinder, and comprising a support element and a base, wherein the support element is disposed on the base and surrounds the base, the plate is disposed on the support element, and a first buffer space is formed between the base and the bottom plate of the casing.

13. The load bearing structure according to claim 12, wherein the casing comprising a first casing part and a second casing part, wherein the second casing part comprises the bottom plate and the at least one cylinder, wherein the plate is a transparent plate.

14. The load bearing structure according to claim 13, wherein the support element comprises a first frame part and a second frame part, the first frame part and the second frame part are symmetrically disposed on the base and surround the base, and are spaced apart from each other, wherein at least one second buffer space is formed among the first frame part, the second frame part, the base and the plate.

15. The load bearing structure according to claim 14, wherein the first frame part, the second frame part and the base are made of aluminum by an extruding process, respectively.

16. The load bearing structure according to claim 14, wherein the first frame part and the second frame part comprise a first portion and at least one second portion, respectively, the at least one second portion is extend from at least one end of the first portion, wherein the at least one second buffer space is formed among the first portion and the at least one second portion of the first frame part, the first portion and the at least one second portion of the second frame part, the base and the plate.

17. The load bearing structure according to claim 16, wherein the support element comprises at least one first fixing plate, the at least one first fixing plate is disposed on at least one of the first portion of the first frame part and the first portion of the second frame part, and extends toward a direction away from the at least one second portion, wherein the base comprises a bottom plate, a plurality of sidewalls and at least one second fixing plate, wherein the plurality of sidewalls are connected adjacent to each other, and connected with the bottom plate to form an accommodation space, wherein the at least one second fixing plate is disposed on at least one of the plurality of sidewalls, and extends toward a direction away from the accommodation space, wherein the at least one first fixing plate is correspondingly disposed on the at least one second fixing plate, and the at least one second fixing plate is correspondingly fixed on the at least one cylinder of the second casing part.

18. The load bearing structure according to claim 17, wherein the base comprises a plurality of reinforcing ribs, wherein the plurality of reinforcing ribs are disposed between the plurality of sidewalls and the at least one second fixing plate, respectively.

19. The load bearing structure according to claim 16, wherein the first portion comprises a first top surface and a first bottom surface, and the at least one second portion comprises a second top surface and a second bottom surface, wherein the first top surface of the first portion is coplanar with the second top surface of the at least one second portion, wherein a step is formed between the first bottom surface of the first portion and the second bottom surface of the at least one second portion.

20. The load bearing structure according to claim 16, wherein the first frame part and the second frame part of the support element comprise a positioning wall, respectively, wherein the positioning wall is disposed on the first top surface of the first portion and the second top surface of the second portion of the first frame part and is disposed on the first top surface of the first portion and the second top surface of the second portion of the second frame part, and a positioning recess is formed among the positioning wall, the first portion and the at least one second portion, wherein the positioning wall surrounds the plate, and at least part of the plate is disposed in the positioning recess.

* * * * *